(12) United States Patent
Goebel

(10) Patent No.: US 8,529,762 B2
(45) Date of Patent: Sep. 10, 2013

(54) SPIRAL WOUND MEMBRANE ELEMENT PRODUCT WATER TUBE WITH EXTERNAL FLOW GROOVES

(75) Inventor: Phillip T. Goebel, New Hope, MN (US)

(73) Assignee: General Electric Company, Schenectady, NY (US)

( * ) Notice: Subject to any disclaimer, the term of this patent is extended or adjusted under 35 U.S.C. 154(b) by 426 days.

(21) Appl. No.: 12/915,619

(22) Filed: Oct. 29, 2010

(65) Prior Publication Data

US 2012/0103454 A1 May 3, 2012

(51) Int. Cl.
*B01D 63/10* (2006.01)
*B01D 63/12* (2006.01)

(52) U.S. Cl.
USPC ............ 210/321.85; 210/321.74; 210/321.83; 210/321.76

(58) Field of Classification Search
None
See application file for complete search history.

(56) References Cited

U.S. PATENT DOCUMENTS

| | | | |
|---|---|---|---|
| 4,476,022 A * | 10/1984 | Doll | 210/321.83 |
| 4,735,717 A * | 4/1988 | Sims | 210/247 |
| 4,906,372 A | 3/1990 | Hopkins | |
| 5,538,642 A | 7/1996 | Solie | |
| 5,681,467 A | 10/1997 | Solie et al. | |
| 6,881,336 B2 | 4/2005 | Johnson | |
| 2009/0008931 A1 | 1/2009 | Kloos et al. | |
| 2009/0236271 A1 | 9/2009 | Eserkaln et al. | |
| 2009/0294361 A1 * | 12/2009 | Larsen | 210/654 |

FOREIGN PATENT DOCUMENTS

WO WO 2006034884 A1 * 4/2006

* cited by examiner

*Primary Examiner* — Krishnan S Menon
(74) *Attorney, Agent, or Firm* — Wegman, Hessler & Vanderburg

(57) ABSTRACT

The disclosed product water tube is for use with a filter element having a filter membrane. The product water tube has a tube wall with a plurality of apertures formed therein to allow permeate from the filter membrane to pass through the tube wall and into a center portion of the tube. The tube wall has an outer surface having a pattern of ridges and channels that conduct the permeate across the outer surface of the tube to the apertures.

1 Claim, 5 Drawing Sheets

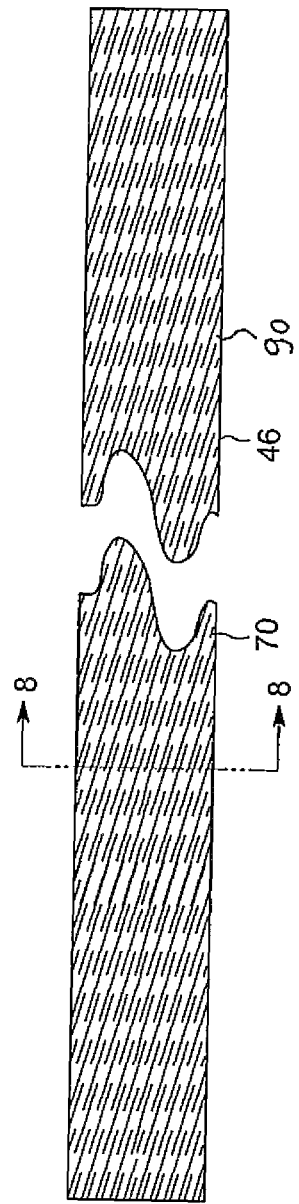
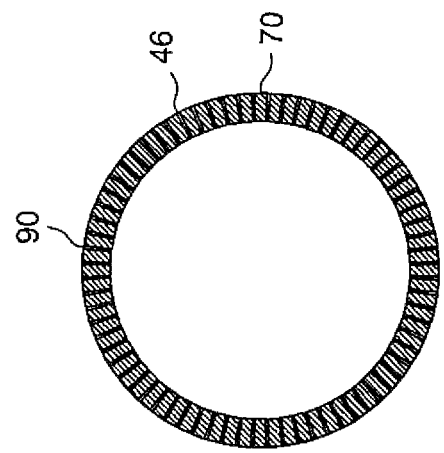
FIG. 7
FIG. 8

SPIRAL WOUND MEMBRANE ELEMENT PRODUCT WATER TUBE WITH EXTERNAL FLOW GROOVES

BACKGROUND OF THE INVENTION

1. Field of the Invention

This invention relates generally to membrane elements for use in reverse osmosis or ultrafiltration separation devices and more particularly, to a spiral wound membrane element product water tube with external channels directing flow of permeate to apertures in the tube.

2. Description of Related Art

The use of semipermeable membranes for effecting liquid separations has become well accepted, and membranes both for ultrafiltration and reverse-osmosis are presently in use for a wide spectrum of applications, including water purification, concentration of dilute mixtures or solutions, waste treatment and/or recovery of recyclable components. A large variety of semipermeable membranes has been developed, and spiral-wound elements have become one accepted type of device which has been found valuable for efficiently providing a large amount of membrane surface area within a given spatial volume.

Referring to FIG. 9, a typical prior art spiral wound reverse osmosis element 10 is shown. The element 10 is formed by wrapping one or more membrane leaves 12 and feed spacer sheets 14 about a central product water collection tube 16. The leaves 12 comprise two generally rectangular membrane sheets 18 surrounding a permeate carrier sheet 20. This "sandwich" structure is commonly held together by adhesive along three edges, although several other means exist to seal the three leaf edges.

The fourth edge of the leaf 12 abuts the product water collection tube 16 so that the permeate carrier sheet 20 is in fluid contact with rows of small holes 22 in the product water collection tube 16. An initial wrap of the permeate carrier sheet 20, typically consisting of between two and four layers of the permeate carrier, is wrapped around the product water tube 16 before insertion of the first membrane leaf 12. This initial wrap of permeate carrier 20 supports the membrane leaf 12 over the holes 22 and provides a path to conduct permeate water from the membrane leaves 12 to the holes in the product water collection tube 16.

The holes 22 typically have a diameter of about 0.125 inches (3.18 mm) to conduct permeate from the permeate carrier 20 wrapped around the outside of the product water collection tube 16 to the center of the tube 16. The holes 22 in the product water collection tube 16 are designed to channel permeate from the outside to the inside of the tube 16 with minimal pressure drop. The maximum size of the hole 22 is limited due to the tendency of the membrane leaf 12 to be drawn into the holes 22 and being damaged. The minimum size and number of holes 22 is limited by the pressure drop created by permeate water flow through the holes 22. The maximum number of holes 22 is limited by manufacturing costs for the product water collection tube 16.

Each leaf 12 is separated by feed spacer sheet 14 that is also wound about the product water collection tube 16. The feed spacer 14 is in fluid contact with both ends of the element and it acts as a conduit for feed solution across the surface of the membrane sheets 18. The direction of feed flow is from the entrance end 24 to the concentrate end 26 and this direction is parallel to the axis A of the central product water collection tube 16.

It would therefore be desirable to have an element design that would aid the flow of permeate from the membrane leaves into the product water collection tube. It also would be desirable to reduce the number wraps of permeate carrier around the product water tube.

SUMMARY OF THE INVENTION

In one aspect, the invention is directed to a product water tube for use with a filter element having a filter membrane. The product water tube has a tube wall with a plurality of apertures formed therein to allow permeate from the filter membrane to pass through the tube wall and into a center portion of the tube. The tube wall has an outer surface having a pattern of ridges and channels that conduct the permeate across the outer surface of the tube to the apertures.

In one embodiment, the ridges and channels on the outer surface of the product water tube are in a spiral pattern along the tube, wherein the outer surface of the wall of the product water tube has spiral ridges and channels that spiral in a first direction along the tube and an inner surface of the wall of the product water tube has spiral ridges and channels formed therein that spiral in an opposing direction along the tube and the apertures are formed at the intersections of the outside and inside channels.

The present invention and its advantages over the prior art will become apparent upon reading the following detailed description and the appended claims with reference to the accompanying drawings.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIG. 7 is an enlarged perspective view of another embodiment of a product water tube of the element of FIG. 1;

FIG. 8 is a sectional view taken along the line 8-8 in FIG.7; and

Corresponding reference characters indicate corresponding parts throughout the views of the drawings.

DETAILED DESCRIPTION OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges included herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements, but may include other elements not expressly listed or inherent to such process, method article or apparatus.

The singular forms "a," "an " and "the " include plural referents unless the context clearly dictates otherwise.

Figure 1:
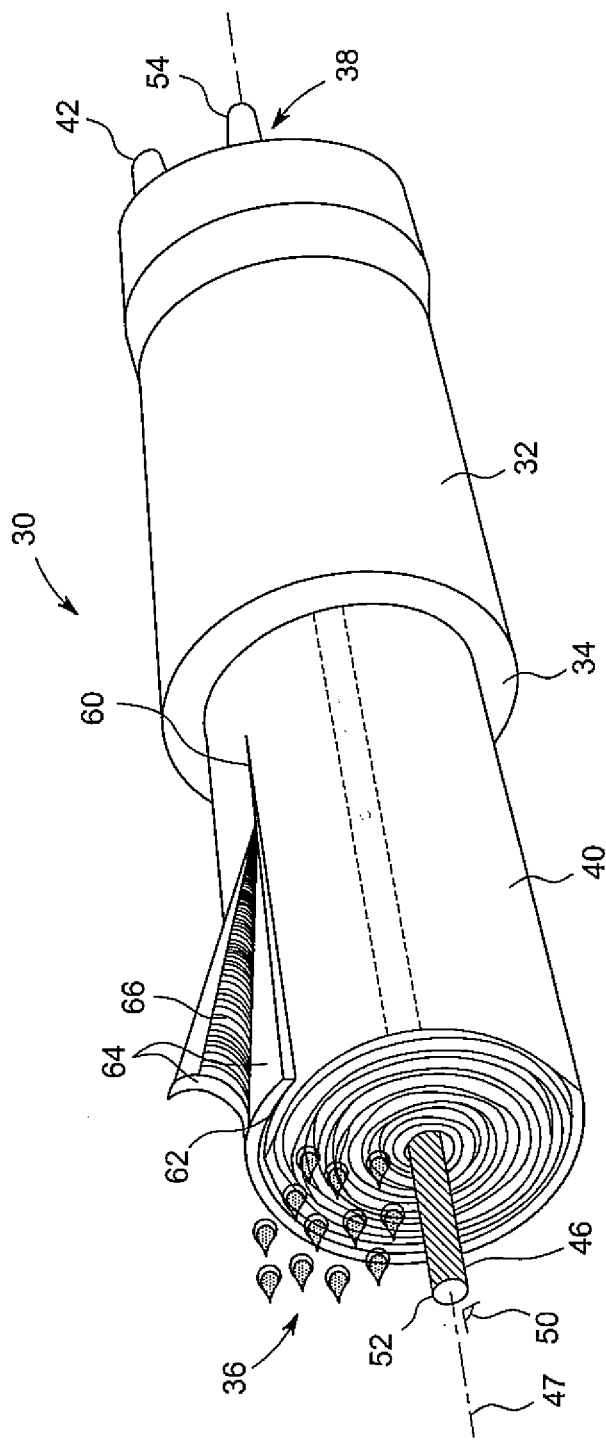
FIG. 1 is a cut-away perspective view of a reverse osmosis element in accordance with an embodiment of the invention.

Referring now to the drawings, FIG. 1 illustrates a filter element generally designated at 30 according to one embodiment of the invention. The filter element 30 has a pressure vessel 32 comprised of a generally tubular body member 34, an inlet end 36 and a discharge end 38. The pressure vessel 32 contains a filter membrane 40 that may be, for example, spiral wound. Desirably, the filter membrane 40 is a reverse osmosis membrane comprised of a suitable semi-permeable material, such as cellulose triacetate, polyamide or other suitable materials that slowly allows water molecules to pass therethrough in a radial direction while rejecting the passage of dissolved salts, minerals and suspended particles. Water from the supplier of the water such as a municipality or the like provides the water to the pressure vessel 32 at its inlet end 36. The brine or wastewater is directed into a discharge tube 42 to a suitable wastewater connection. As assembled, the pressure vessel 32 is designed to withstand for continuous operation the operating pressure of the water supplied thereto which, for example, may be on the order of 40 to 80 pounds per square inch.

A product water tube 46 is in the center of the pressure vessel 34 and the membrane 40 is wrapped therearound. The product water tube 46 is tubular about a centerline 47 and is provided with a plurality of apertures therein to allow the permeate water to enter the interior 50 of the product water tube 46 as will be described more fully below. Permeate water flows in the product water tube 46 from a first end 52 to a second end 54 thereof. The first end 52 is sealed to prevent the feed water flowing from the inlet 36 from entering the product water tube 46 without first passing through the membrane 40. The second end 54 of the product water tube 46 is connected to a transfer tube (not shown) such that the water purified by the membrane 40 may be used as desired.

The membrane 40 is desirably a spiral wound element so as to incorporate a large surface area into a small volume. The membrane 40 is formed by wrapping one or more membrane leaves 60 and feed spacer sheets 62 about the central product water tube 46. Each leaf 60 comprises two generally rectangular membrane sheets 64 surrounding a permeate carrier sheet 66. The edge of the leaf 60 abuts the product water tube 46 so that the permeate carrier sheet 66 is in fluid contact with the apertures 48 in the product water tube 46.

Figure 2:
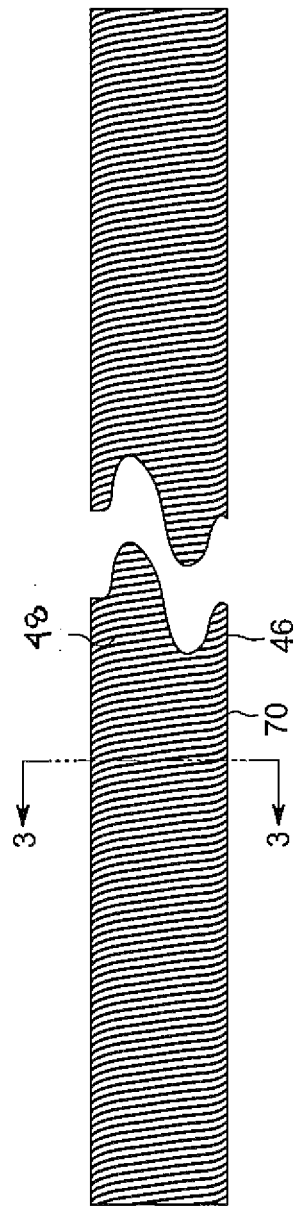
FIG. 2 is an enlarged perspective view of an embodiment of a product water tube of the element of FIG. 1.
Figure 4:
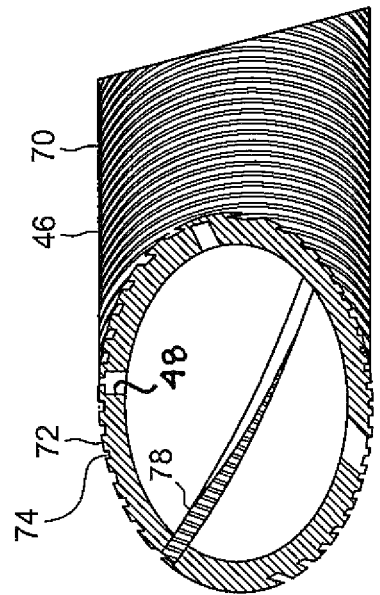
FIG. 4 is a cut-away perspective view of the product water tube of FIG. 2.
Figure 3:
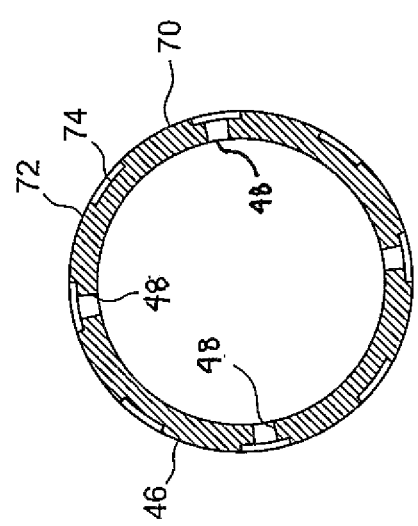
FIG. 3 is a sectional view of the product water tube of FIG. 2 taken along line 3-3 in FIG. 2.

Turning now to FIGS. 2-4, according to the invention, the outer surface 70 of the product water tube 46 has a pattern of ridges 72 and channels 74 formed therein and configured to conduct permeate water toward the apertures 48 in the product water tube 16. Desirably, the depth of the channels 74 is between about 0.002 inches and about 0.005 inches deep. The distance between adjacent ridges 72 on either side of a channel 74 is desirably between about 0.02 inches and about 0.06 inches. The ridges 72 on the outer surface 70 of the product water tube 46 support the adjacent membrane leaf 60 and space the membrane leaf 60 away from the apertures 48 to aid in preventing the membrane leaf 60 from being drawn into the apertures 48. In one embodiment, a single layer of permeate carrier 66 wraps around the product water tube 46 between the membrane leaf 60 and product water tube 46. Accordingly, the leader on the permeate carrier 66 only needs to be long enough to facilitate attachment to the product water tube 46.

In one embodiment, the ridges 72 and channels 74 are in a spiral pattern around the product water tube 46. The apertures 48 are formed in a plurality rows 78 along the length of the product water tube 46 in the bottom of the channels 74. In one embodiment, the apertures 48 may be circular holes having a diameter of about 0.125 inches (3.18 mm) to conduct permeate from the permeate carrier 66 to the center of the tube 46 and are designed to channel permeate from the outside to the inside of the tube 46 with minimal pressure drop.

Figure 5:
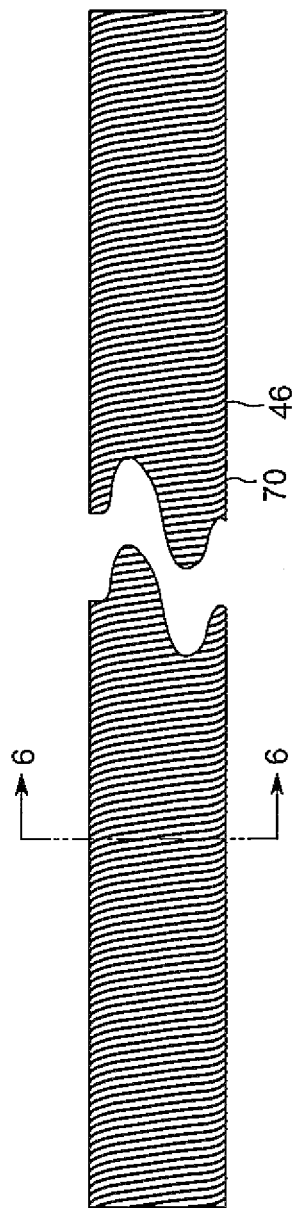
FIG. 5 is an enlarged perspective view of another embodiment of a product water tube of the element of FIG. 1.
Figure 6:
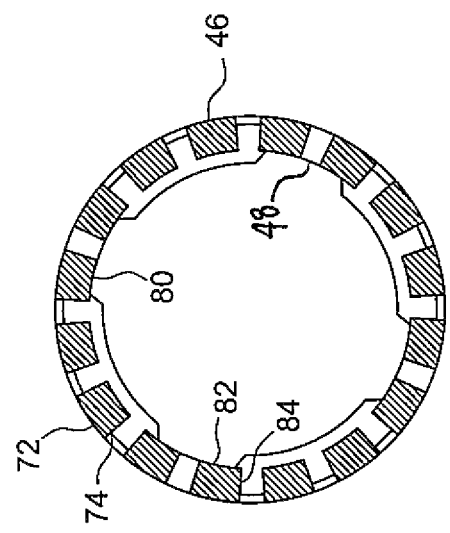
FIG. 6 is a sectional view of the another embodiment of the product water tube of FIG. 2 taken along line 7-7 in FIG. 6.
Figure 9:
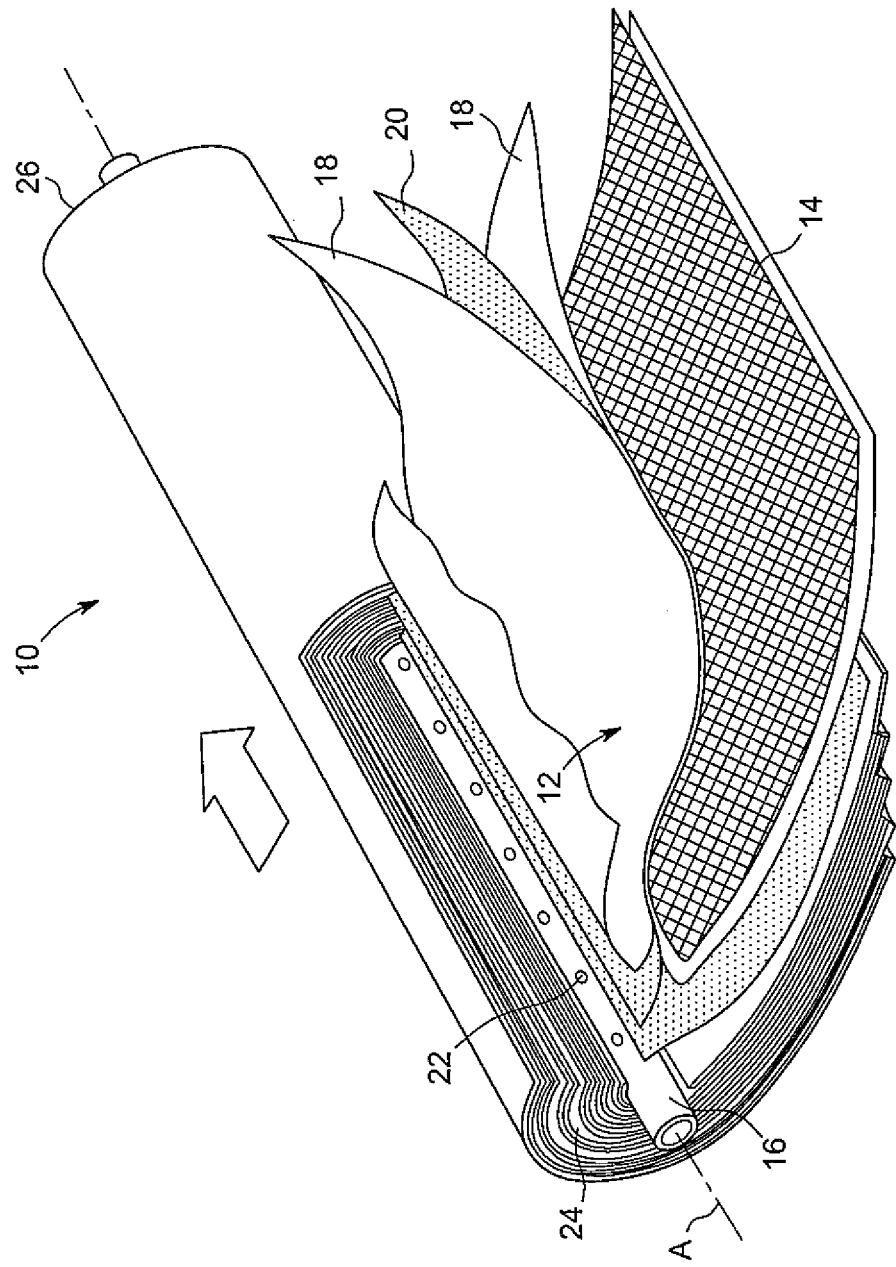
FIG. 9 is a cut-away perspective view of a prior art reverse osmosis element.

Turning now to FIGS. 5 and 6, in one embodiment the outer surface 70 of the product water tube 46 has spiral ridges 72 and channels 74 that spiral in a first direction along the length of the tube 46 and an inner surface 80 of the product water tube has spiral ridges 82 and channels 84 formed therein that spiral in an opposing direction along the length of the tube 46. The apertures 48 through the product water tube 46 are formed at the intersections of the outside 74 and inside channels 84.

Turning now to FIGS. 7 and 8, another embodiment of the product water tube 46 is illustrated. In this embodiment, the ridges 72 and channels 74 are formed in a staggered and cross-hatched pattern on the outer surface 70 of the product water tube 46. The channels 74 are formed by a series of staggered narrow slots 90 that lead to the interior of the product water tube 46. The textured outer surface 70 of the product water tube 46 formed by the ridges 72 supports the membrane 40 and the slots 90 create a flow path for the permeate. In one embodiment, the width of the slots 90 is between 0.02 inches and 0.10 inches and the slot length is between 0.010 inches and 1.00 inches.

Desirably, the product water tube 46 is made using a molding process. In a molded tube, the patterned outer surface 70 and narrow slots 48 in the product water tube 46 may be added with little or no change in manufacturing cost. It is believed that the size and number of the slots 48 can provide more flow at lower pressure drop and be small enough to not allow the membrane 40 to be damaged and the surface texture of the tube can provide the flow path needed. The narrow slots 48 through the product water tube 46 and the pattern on the outer surface 70 of the tube 46 are improvements over using round holes and multiple layers of permeate carrier 66 as it would result in using less material, resulting in a cost savings, more active membrane area and improve flow and rejection performance.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the scope of the disclosure as defined by the following claims.

What is claimed is:

1. A product water tube for use with a filter element having a filter membrane, the product water tube comprising a tube wall having a plurality of apertures formed therein to allow permeate from the filter membrane to pass through the tube wall and into a center portion of the tube, wherein the tube wall has an outer surface having a pattern of ridges and channels that conduct the permeate across the outer surface of the tube to the apertures, wherein the ridges and channels on the outer surface of the product water tube are in a spiral pattern along the tube, and wherein the outer surface of the wall of the product water tube has spiral ridges and channels that spiral in a first direction along the tube and an inner surface of the wall of the product water tube has spiral ridges and channels formed therein that spiral in an opposing direction along the tube and the apertures are formed at the intersections of the outside and inside channels.

* * * * *